(12) United States Patent
Solie et al.

(10) Patent No.: US 9,819,257 B2
(45) Date of Patent: Nov. 14, 2017

(54) DC-TO-DC CONVERTER INPUT NODE SHORT PROTECTION

(71) Applicant: INTERSIL AMERICAS LLC, Milpitas, CA (US)

(72) Inventors: Eric Magne Solie, Durham, NC (US); Bin Li, Apex, NC (US)

(73) Assignee: INTERSIL AMERICAS LLC, Milpitas, CA (US)

(*) Notice: Subject to any disclaimer, the term of this patent is extended or adjusted under 35 U.S.C. 154(b) by 0 days.

(21) Appl. No.: 14/989,213

(22) Filed: Jan. 6, 2016

(65) Prior Publication Data

US 2017/0012528 A1 Jan. 12, 2017

Related U.S. Application Data

(60) Provisional application No. 62/190,983, filed on Jul. 10, 2015, provisional application No. 62/221,886, filed on Sep. 22, 2015, provisional application No. 62/253,501, filed on Nov. 10, 2015.

(51) Int. Cl.
*H02M 1/32* (2007.01)
*H02H 1/00* (2006.01)
*H02H 7/12* (2006.01)
*H02M 3/158* (2006.01)
*H02M 1/00* (2006.01)

(52) U.S. Cl.
CPC .............. *H02M 1/32* (2013.01); *H02H 1/003* (2013.01); *H02H 7/1213* (2013.01); *H02M 3/1582* (2013.01); *H02M 2001/0045* (2013.01)

(58) Field of Classification Search
CPC ........... H02M 3/158; H02M 2001/006; H02M 2001/0083; H02M 1/36; H02M 1/32
See application file for complete search history.

(56) References Cited

U.S. PATENT DOCUMENTS

| 4,386,308 A | 5/1983 | Emile, Jr. et al. |
| 4,931,742 A | 6/1990 | Karash et al. |
| 4,955,069 A | 9/1990 | Ionescu |
| 5,345,180 A | 9/1994 | Maier et al. |

(Continued)

OTHER PUBLICATIONS

"Automatic Test Equipment", "retrieved from http://www.ece.uc.edu/~wjone/ATE.pdf", Aug. 9, 2000, pp. 131.

(Continued)

*Primary Examiner* — Gustavo Rosario Benitez
(74) *Attorney, Agent, or Firm* — Foley & Lardner LLP; Mark J. Danielson

(57) ABSTRACT

Embodiments described herein relate to a circuit including a DC-to-DC converter and a switching device to selectively isolate an input voltage from an input node of the DC-to-DC converter. The circuit also includes a controller coupled to the input node and to the switching device. The controller is configured to apply a test voltage to the input node, to enable the switching device to be switched from a non-conductive state to a conductive state if a voltage on the input node is above a threshold while the test current is applied to the input node, and to restrict the switching device from being switched from the non-conductive state to the conductive state if the voltage on the input node is below the threshold while the test current is applied to the input node.

22 Claims, 4 Drawing Sheets

(56) References Cited

U.S. PATENT DOCUMENTS

| | | | | |
|---|---|---|---|---|
| 6,329,796 B1* | 12/2001 | Popescu | ............... | H02J 1/10 |
| | | | | 320/134 |
| 6,331,941 B1 | 12/2001 | Smith | | |
| 6,424,513 B1 | 7/2002 | Wissell et al. | | |
| 6,597,552 B1 | 7/2003 | Griepentrog et al. | | |
| 7,187,137 B2 | 3/2007 | Yadlapalli | | |
| 7,199,558 B2 | 4/2007 | Solie et al. | | |
| 7,719,236 B2* | 5/2010 | Hartular | ............... | H02M 3/156 |
| | | | | 307/66 |
| 2008/0310196 A1* | 12/2008 | Lin | ............... | H02M 1/36 |
| | | | | 363/49 |
| 2009/0033293 A1* | 2/2009 | Xing | ............... | H02J 7/0077 |
| | | | | 320/164 |
| 2009/0167245 A1* | 7/2009 | Nguyen | ............... | H02J 7/0052 |
| | | | | 320/128 |
| 2010/0123987 A1* | 5/2010 | Pietrzyk | ............... | H01H 47/002 |
| | | | | 361/78 |
| 2012/0062198 A1* | 3/2012 | Takano | ............... | H02M 1/36 |
| | | | | 323/282 |
| 2013/0088894 A1 | 4/2013 | Rozman et al. | | |
| 2013/0093326 A1 | 4/2013 | Zhang et al. | | |
| 2015/0207401 A1* | 7/2015 | Zhang | ............... | H02M 3/158 |
| | | | | 323/271 |

OTHER PUBLICATIONS

Choong et al., "Eidothea Open Short Test Tool", "International Conference on Intelligent and Advanced Systems 2007", Nov. 25-28, 2007, pp. 1359-1362, Published in: Kuala Lumpur, Malaysia.
"Opens and Shorts Testing Reference Design", "Retrieved from http://www.ni.com/white-paper/6980/en/", Sep. 8, 2013, No. 1-8.
"Basics of ATE Test", Aug. 8, 2007, No. 1-490.

* cited by examiner

DC-TO-DC CONVERTER INPUT NODE SHORT PROTECTION

CROSS-REFERENCE TO RELATED APPLICATIONS

This application claims the benefit of priority to U.S. Provisional Application No. 62/190,983, filed on Jul. 10, 2015, U.S. Provisional Application No. 62/221,886, filed on Sep. 22, 2015, and to U.S. Provisional Application No. 62/253,501, filed on Nov. 10, 2015, all of which are incorporated herein by reference.

DETAILED DESCRIPTION

Figure 1:
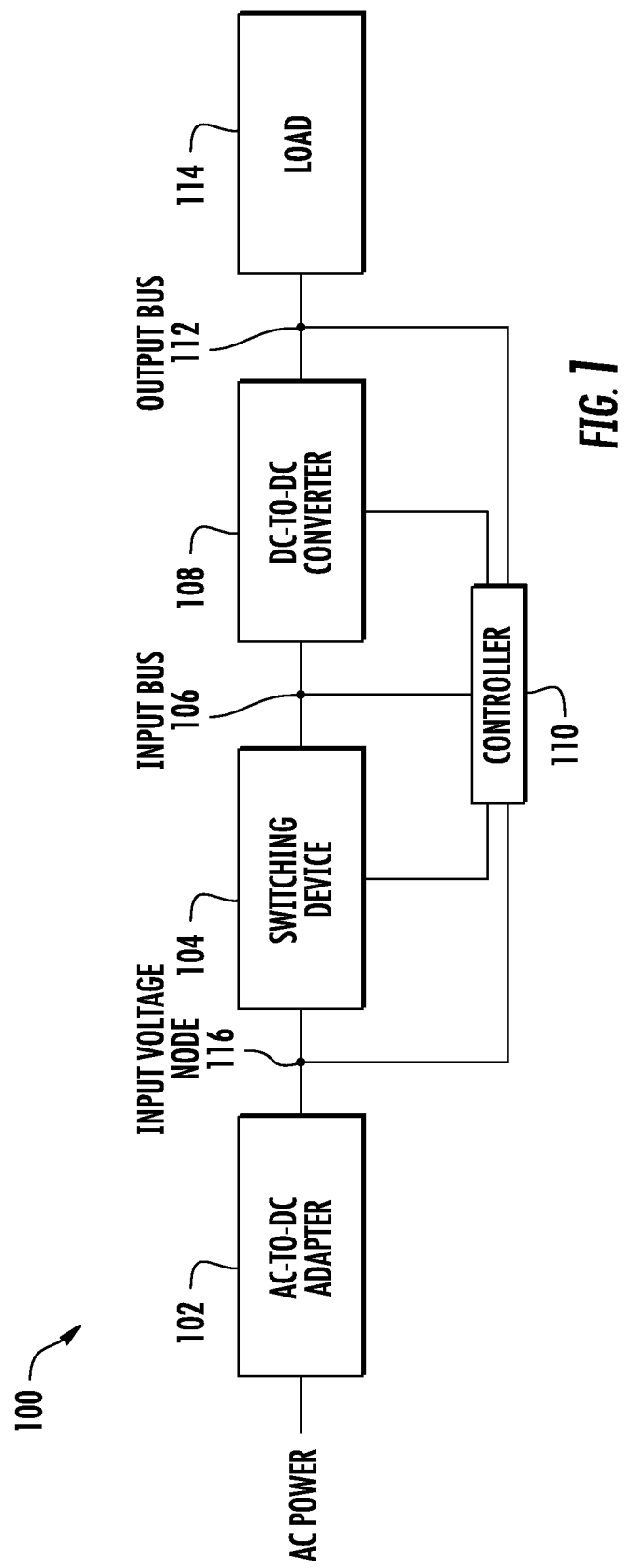
FIG. 1 is a block diagram of an example power system including input node short protection.

FIG. 1 is a block diagram of an example system 100 including input voltage short protection. The system 100 includes an AC-to-DC adapter 102 (also referred to herein as "AC-DC adapter" 102) for converting AC power to a DC voltage. A switching device 104 is coupled in series between the AC-DC adapter 102 and an input node 106 of a DC-to-DC converter 108 (also referred to herein as "DC-DC converter" 108). The switching device 104 selectively isolates the DC voltage (also referred to herein as the "input voltage") of the AC-DC adapter 102 from the input node 106. Node 116 between the AC-DC adapter 102 and the switching device 104 is referred to herein as the "DC supply node" 116. The switching device 104 selectively isolates the input voltage from the input node 106 by being switchable between at least two states. In a first state current flow is restricted from input node 116 to the input node 106. In a second state current is allowed to flow freely from the input node 116 to the input node 106. Although the input voltage at DC supply node 116 is described herein as being provided by AC-DC adapter 102, it should be understood that any suitable supply of a DC voltage can be used, including, for example, a battery.

The DC-DC converter 108 operates conventionally to convert DC voltage on the input node 106 to an output DC voltage and applies the output DC voltage to an output node 112. The DC-DC converter 108 can have any appropriate topology including that of a buck converter, boost converter, buck-boost converter and others.

A load 114 is coupled to the output node 112 to consume the output DC voltage applied by the DC-DC converter 108. The load 114 can be any suitable component coupled to output node 112 to draw power therefrom. Such components can include, but are not limited to, one or more processing devices and related components and/or a battery and associated battery charging circuit.

The DC-DC converter 108 is controlled by a controller 110. The controller 110 controls operation of the DC-DC converter 108 to generate the desired output voltage on the output node 112. The controller 110 can sense a voltage on the input node 106 and a voltage on the output node 112 in order to control the DC-DC converter 108 to generate the desired output voltage. Methods of controlling the DC-DC converter 108 are known in the art.

The controller 110 also controls the switching device 104 in order to control whether the input voltage is coupled to the input node or whether the input node is isolated from the input voltage.

It should be understood that the block diagram shown in FIG. 1 is a simplified illustration of system 100. In practice additional components such as transistors, capacitors, resistors, diodes, etc. can be included, coupled to the DC supply node 116, input node 106, and/or output node 112.

Figure 2:
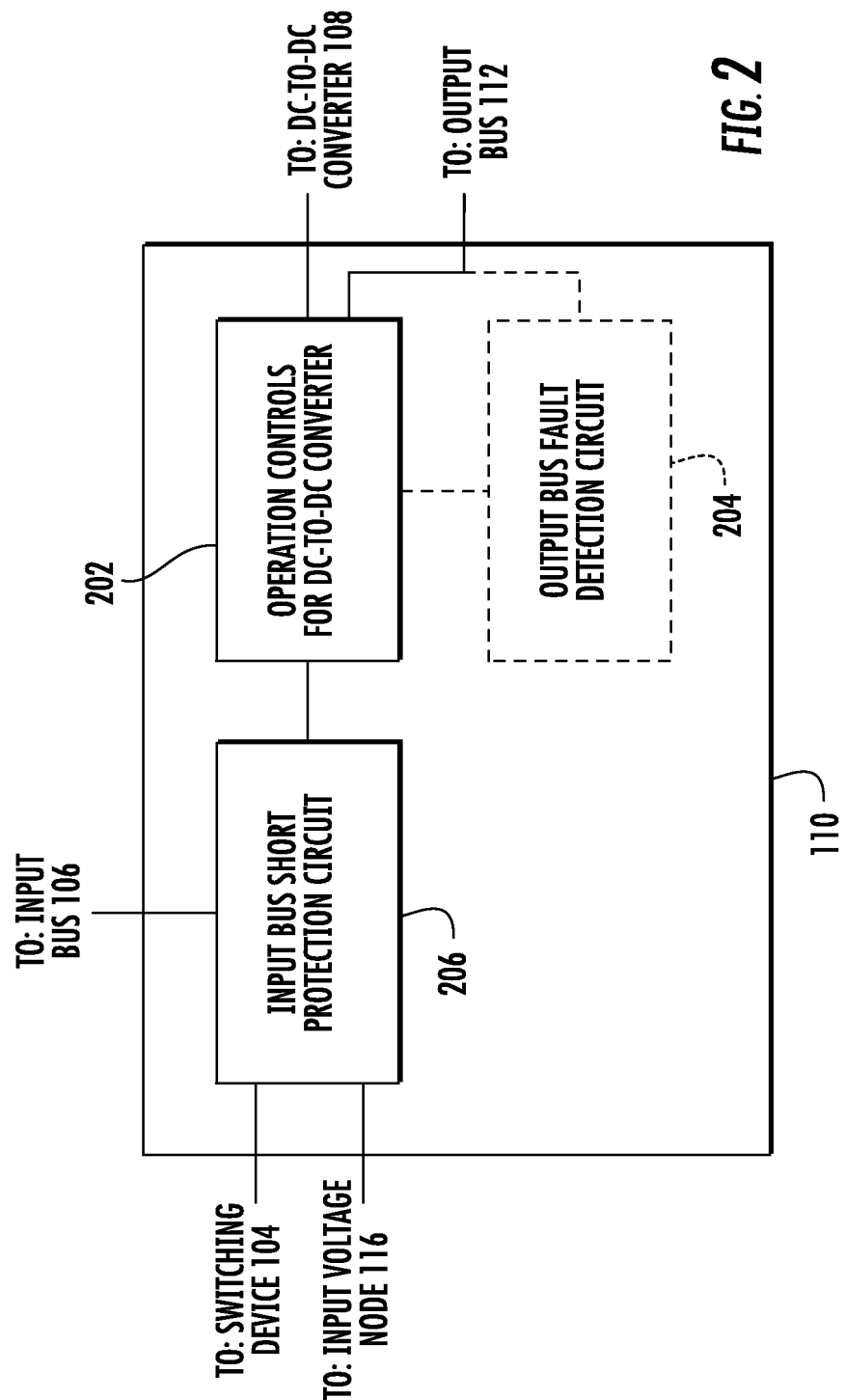
FIG. 2 is a block diagram of an example controller of the power system of FIG. 1.

FIG. 2 is a block diagram of an example controller 110. The controller 110 includes DC-DC operation controls 202 which drive and control the operation of the DC-DC converter 108 to generate a desired output voltage on the output node 112 from an input voltage coupled to the input node 106. The DC-DC operation controls 202 can be coupled to one or more gates of one or more field effect transistors (FETs) in the DC-DC converter 108 to control the operation thereof. In an example, the DC-DC operation controls 202 includes a PWM modulator and drivers for the one or more FETs in the DC-DC converter 108. As mentioned above, methods of controlling a DC-DC converter to generate an output voltage are known. Any suitable method of controlling the DC-DC converter 108 can be used.

Controller 110 can optionally include an output voltage fault detection circuit 204. The output voltage fault detection circuit 204 is coupled to the output node 112 and can sense a voltage and/or current on the output node 112 to identify any fault conditions for the output node 112. For example, the output voltage fault detection circuit 204 can determine whether the output node 112 is unintentionally coupled to ground (i.e., a short circuit situation), whether the current through the output node 112 is above a threshold (i.e., an overcurrent situation), and other fault conditions. If the fault detection circuit 204 identifies a fault condition for the output node 112, the fault detection circuit 204 can take appropriate action such as a shutting down the DC-DC converter 108 or isolating the output node 112 from the load 114. Output voltage fault detection circuits 204 are known, and any suitable output voltage fault detection circuit can be used.

Controller 110 also includes an input voltage short protection circuit 206. The input voltage protection circuit 206 is coupled to the input node 106, the switching device 104, and the DC supply node 116. The input voltage protection circuit 206 controls the switching device 104 to selectively isolate the input voltage from the input node 106. That is, the input voltage protection circuit 206 sets the switching device 104 to the first state to isolate the input voltage from the input node 106 or to the second state to couple the input voltage to the input node 106.

The input voltage protection circuit 206 determines whether or not to isolate the input voltage from the input node 106 based on a protection scheme. The protection scheme can protect against a short (to ground) on the input node 106. For example, if a capacitor coupled to the input node 106 is failing or has failed and creates a short to ground, the capacitor may begin to smoke and start on fire due to high current flowing from the input node 106 through the capacitor. To protect against such a short on the input node 106, the protection scheme implemented by the input voltage protection circuit 206 determines whether a short is present on the input node 106 prior to coupling the input voltage to the input node 106.

If a short is present on the input node 106, the protection circuit 206 can restrict coupling the input voltage to the input node 106, thereby reducing the likelihood of further damage due to the short. In an example, the protection circuit 206 can be configured to maintain restricting the switching device 104 from switching to the conductive state once a short is detected, until the voltage on the input node 106 raises above the threshold implying that the short is fixed. In another example, the protection circuit 206 can be configured to maintain restricting the switching device 104 from switching to the conductive state once a short is detected, until the protection circuit 206 is reset (e.g., by the removal and re-application of power) causing the protection circuit 206 to re-initiate the protection scheme. In some examples, the protection scheme implemented by the protection circuit 206 can make other verifications in addition to a check for a short on the input node 106 prior to and/or after coupling the input voltage to the input node 106.

In an example, restricting coupling the input voltage to the input node 106 includes setting the one or more switches 104 to the first state to isolate the input node 106 from the input voltage in response to the determination that there is a short on the input node 106, regardless of whether the protection scheme includes other verifications or not. Thus, in this example, the protection scheme always isolates the input node 106 from the input voltage in response to a determination of a short on the input node 106.

In some examples, the protection circuit 206 may take other actions in addition to isolating the input node 106 in response to a determination that a short is present. For example, the protection circuit 206 may send a signal providing an alert that the DC-DC converter 108 is not-operational.

If a short is not present on the input node 106, the protection circuit 206 can enable the input voltage to be coupled to the input node 106, thereby allowing the input voltage to be provided to the DC-DC converter 108. In a first example, the protection scheme includes no other verifications, such that enabling the input voltage to be coupled to the input node 106 includes setting the one or more switches 104 to the second state to couple the input voltage to the input node 106 in response to the determination that there is no short on the input node 106.

In a second example, the protection scheme can include other verifications, such that enabling the input voltage to be coupled to the input node 106 includes allowing the input voltage to be coupled to the input node 106 subject to the other verifications. For instance, if all the other verifications also enable coupling the input voltage to the input node 106, the protection circuit 106 sets the one or more switches 104 to the second state to couple the input voltage to the input node 106. If, however, one or more of the other verifications does not enable coupling the input voltage to the input node 106, the protection circuit 206 isolates the input voltage from the input node 106 even though no short was detected.

As mentioned above, the protection circuit 206 can implement the protection scheme prior to coupling the input voltage to the input node 106. For example, prior to start-up of the DC-DC converter 108, the protection scheme can be implemented to determine whether to couple the input voltage to the input node 106. In an example, if the protection scheme determines that the input voltage can be coupled to the input node 106, a signal can be provided to the controls 202 for the DC-DC converter 108 to initiate start-up of the DC-DC converter 108. In other examples, the controls 202 for the DC-DC converter 108 can independently sense the input voltage on the input voltage bus 106 to initiate start-up of the DC-DC converter 108.

Figure 3:
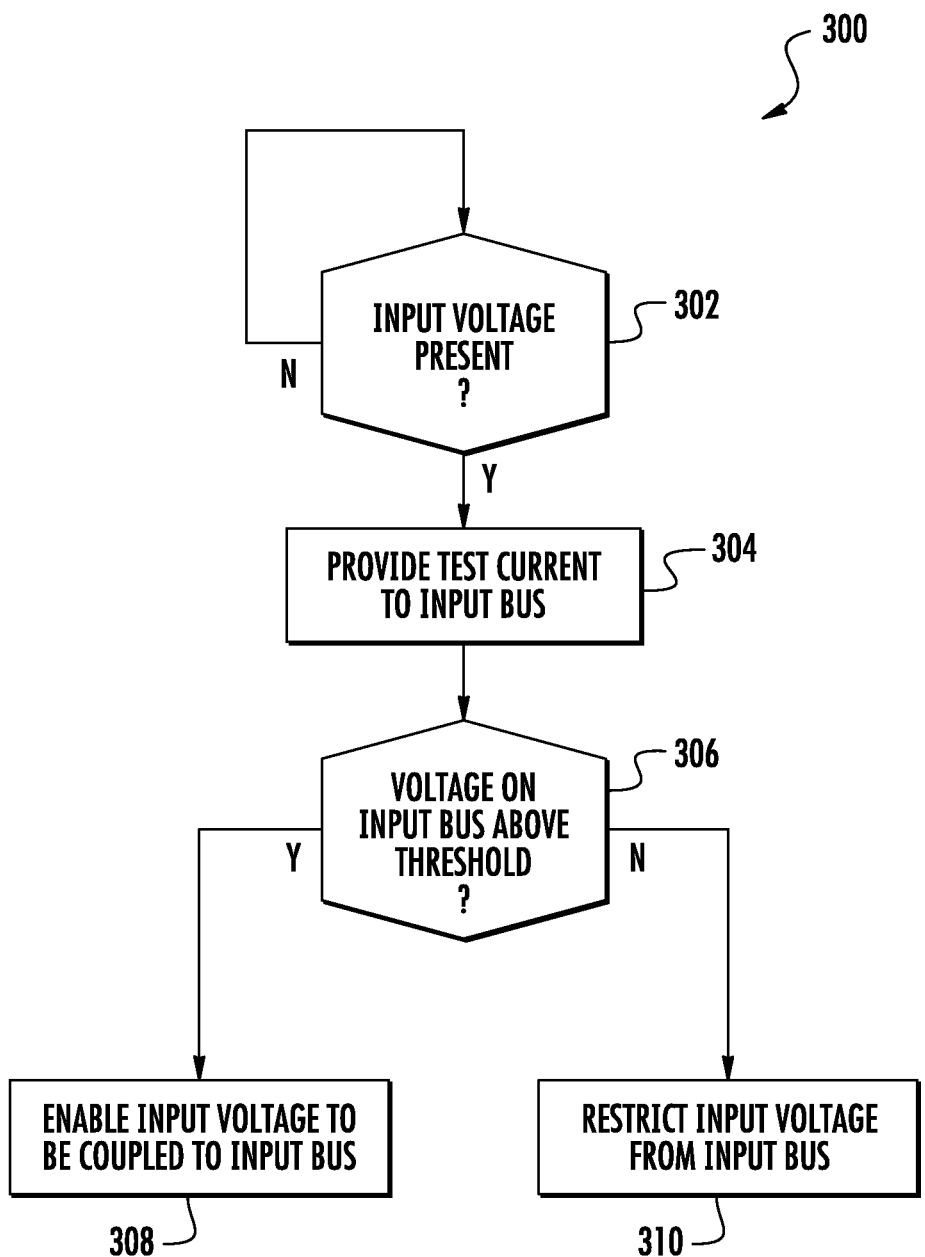
FIG. 3 is a flow diagram of an example method of applying an input voltage to an input node of the DC-to-DC converter of FIG. 1.

FIG. 3 is a flow diagram of an example method 300 of implementing the protection scheme using the system of FIGS. 1 and 2. In an example, the protection circuit 206 can perform the protection scheme prior to each planned coupling of the input voltage to the input node 106. Such a planned coupling of the input voltage to the input node 106 can occur during the transition of the DC-DC converter 108 from a sleep state to a wake state and/or in response to the input voltage becoming present at the DC supply node 116. For example, AC power may be applied to and removed from the system 100 by, for example, mating and de-mating a power cable plug with a power receptacle. The application of and removal of AC power causes a corresponding generation of and absence of DC input voltage at the input node 116. In many electronic devices, the AC-DC adapter 102 is integrated into a power cable for the electronic device, and the power cable and AC-DC-adapter 102 can be detached from the electronic device.

In any case, the protection circuit 206 can be configured to sense when the input voltage is present (block 302), and to perform the protection scheme in response thereto. Prior to the input voltage being present (i.e., while the input voltage is not present), the protection circuit 206 sets the switching device 104 to isolate the input node 116 from the input node 106. The protection circuit 206 then senses the voltage at the input node 116 to determine when input voltage is present at the input node 116. For example, the protection circuit 206 can compare the voltage at the input node 116 to an input-voltage-present threshold. When the voltage at the input node 116 rises above the threshold, the protection circuit 206 can implement the protection scheme in response thereto. Such a protection scheme can be used to check for a short on the input node 106 each time an electronic device is coupled to AC power (e.g., line power).

To determine whether there is a short on the input node 106, the protection circuit 206 can apply a test current to the input node 106 (block 304), and determine whether there is a short in the input node 106 based on a resulting voltage on the input node 106. While the test current is applied to the input node 106, the protection circuit 206 can set (e.g., maintain) the switching device 104 in the first state to isolate the input node 106 from the input voltage. Additionally, the protection circuit 206 can cause (e.g., via a signal to the controls 202 for the DC-DC converter 108) the DC-DC converter 108 to be set such that the input node 106 is not shorted to ground though the DC-DC converter 108. Any other controllable components coupled to the input node 106 can also be set such that there are no shorts from the input node 106 to ground through those components if the components are functioning properly.

If there is no short to ground coupled to the input node 106 (i.e., the input node 106 and components coupled thereto are working properly), applying the test current to the input node 106 will cause the voltage on the input node 106 to rise. If there is a short coupled to the input node 106, applying the test current to the input node 106 will result in little or no voltage rise on the input node 106. Thus, the protection circuit 206 can be configured to detect a short on the input node 106 by sensing the voltage on the input node while the test current is applied thereto, and comparing the sensed voltage to a minimum voltage threshold (block 306).

If the voltage on the input node 106 is above the threshold, there is likely no short on the input node 106, and the protection circuit 206 responds by enabling the input voltage to be coupled to the input node 106 as discussed above (block 308). If the voltage on the input node 106 is below the threshold, there likely is a short on the input node 106, and the protection circuit 206 responds by restricting the input voltage from being coupled to the input node 106 as discussed above (block 310). In an example, the protection circuit 206 can wait for a waiting period after applying the test current before sensing the voltage on the input node 106. That is, the protection circuit 206 can start applying the test current and continue applying the test current at least until the voltage on the input node 106 is sensed. The protection circuit 206 can start a waiting period when the test current is initially applied to the input node 106 and sense the voltage on the input node 106 at the end of the waiting period. The waiting period can be used to enable any bus capacitance to be overcome by the test current, allowing the voltage on the input node 106 to rise above the threshold. The duration of the waiting period can be selected during design of the system 100 based on the known capacitance of the input node 106 and/or based on empirical testing.

The magnitude of the test current and the threshold can be selected during design of the system 100 such that the voltage on the input node 106 is unlikely to rise above the threshold when a short is present on the input node 106, but will rise above the threshold when a short is not present on the input node 106. Additionally, the test current can be set sufficiently smaller than a normal operational current through the input node 106 to reduce the likelihood of the test current itself causing significant damage (e.g., smoke, fire, etc.) to any shorted components coupled to the input node 106.

In an example, the normal operating voltage on the input node 106 is in the range of 0 to 23 volts and the normal operating current on the input node 106 is in the range of 0 to 6 amps. In this example, the input voltage present threshold used to determine when input voltage is present at the input node 116 is 2 volts. Additionally, in this example, the test current is 5 mA and the minimum voltage threshold used to determine whether a short is present on the input node 106 is 2 volts.

Figure 4:
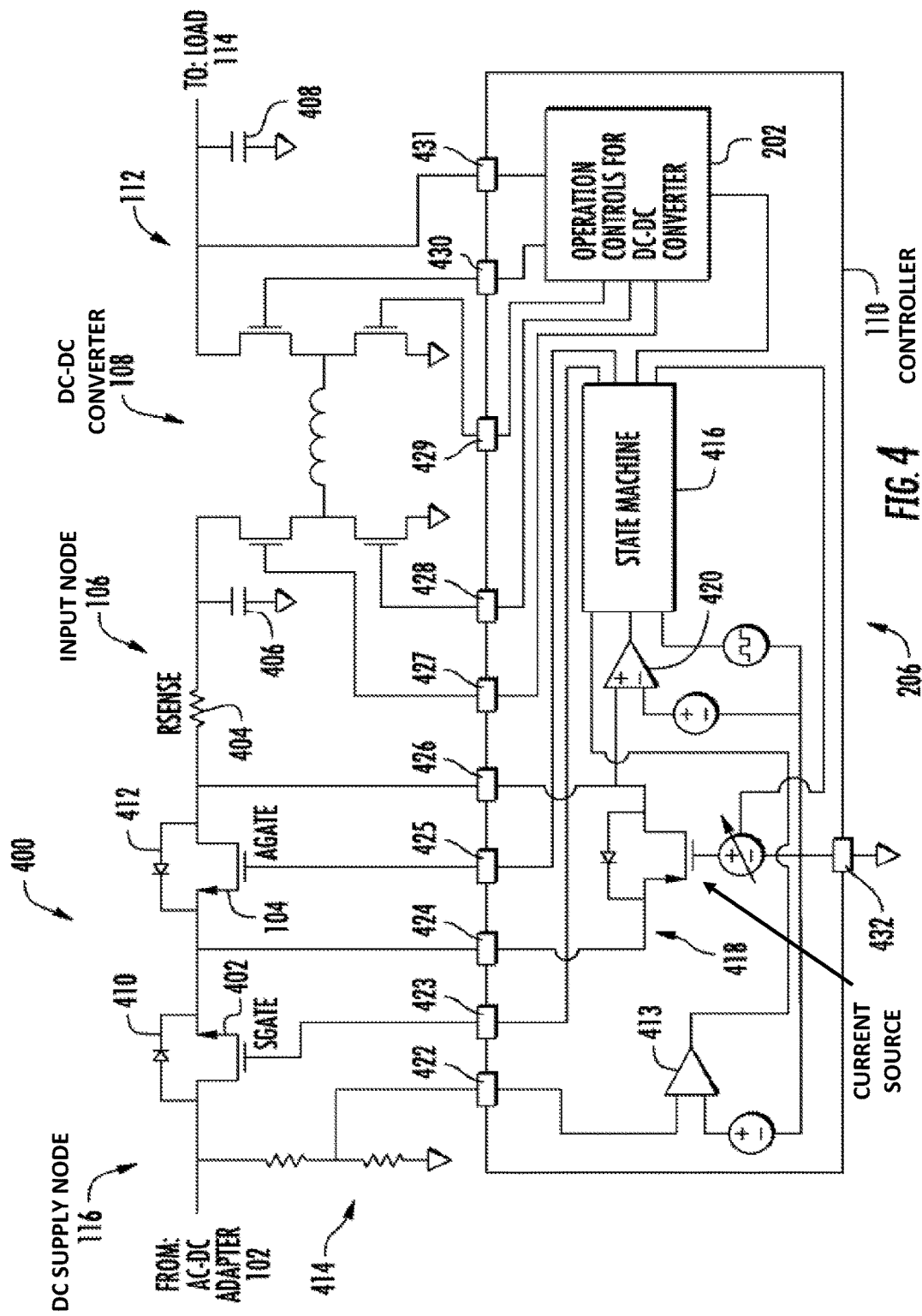
FIG. 4 is a circuit diagram of example switching device, controller, and DC-to-DC converter of the power system of FIG. 1.

FIG. 4 is a circuit diagram of an example circuit 400 implementing the switching device 104, DC-DC converter 108, and controller 110 of system 100. As shown the input voltage from the AC-DC adapter is applied to the input node 116. With reference to FIG. 4, the switching device 104 is also referred to as "AGATE" 104. AGATE 104 can be coupled in series with another switching device 402 (also referred to herein as "SGATE" 402). Both AGATE 104 and SGATE 402 are coupled in series between the DC supply node 116 and the input node 106 to selectively isolate the input node 106 from the DC supply node 116. In this example, AGATE 104 provides selective forward isolation, by blocking current from the input node 116 to the input node 106. SGATE 402 provides selective backward isolation, by blocking current from the input node 106 to the input node 116. In combination, the SGATE 402 and AGATE 104 can be set to respective first (e.g., non-conductive) states where current flow is restricted in both directions between the input node 116 and the input node 106 and to respective second (e.g., conductive) states where current flows freely in both directions between the input node 116 and the input node 106.

In this example, SGATE 402 comprise a first field effect transistor FET and AGATE 104 comprise a second FET. When the first FET is in a conductive state, current flows freely from the input node 106 to the input node 116. When the first FET is in a non-conductive state, current is restricted from flowing from the input node 106 to the input node 116. Likewise, when the second FET is in a conductive state, current flows freely from the input node 116 to the input node 106. When the second FET is in a non-conductive state, current is restricted from flowing from the input node 116 to the input node 106.

Circuit 400 includes a first diode 410 in parallel with the first FET and connected such that current flows freely through the first diode 410 around the first FET in the forward direction is restricted around the first FET in the direction towards the input node 116. Likewise, a second diode 412 is in parallel with the second FET and connected such that current flows freely through the second diode 412 around the second FET in the direction towards the input node 116 and current flow is restricted around the second FET in the direction towards the input node 106.

In an example, the first FET and the second FET are metal-oxide-semiconductor field-effect transistors (MOSFETs). In other examples, SGATE 402 and/or the first and second diodes 410, 412 are not included. In yet other examples, diode 410 is a body diode of the first FET and diode 412 is a body diode of the second FET.

In this example, a sense resistor 404 and a capacitor 406 are coupled to the input node 106. Failure of the capacitor 406 can lead to a short on the input node 106 through the capacitor 406. Without the protection scheme implemented herein, such a short could cause a large current to flow through the capacitor 406 and lead to smoke and/or fire.

As discussed above, the DC-to-DC converter 108 is coupled to the input node 106 and is configured to convert a voltage on the input node 106 to provide a desired direct current (DC) voltage to the output node 112. In this example, the DC-to-DC converter 108 includes a plurality of switching devices (e.g., FETs) and an inductor. It should be understood, however, that any suitable DC-to-DC converter 108 can be used, including a buck converter, boost converter, buck-boost converter and others.

In an example, the output node 112 is a power rail for an electronic device. The output node 112 can have a capacitor 408 coupled thereto. Additionally, any suitable component can be coupled to the output node 112 to draw power therefrom. Such components can include, but are not limited to, one or more processing devices and related components and/or a battery and associated battery charging circuit.

The controller 110 can be implemented on a packaged circuit such as a packaged integrated circuit (IC) as shown in FIG. 4. As known, a packaged IC includes a circuit with molding compound over the circuit and a plurality of exposed terminals for coupling of the encapsulated circuit to external components. Any suitable molding compound can be used such as a thermoset, thermoset epoxy, or thermoplastic. A subset of the terminals packaged IC can include a plurality of terminals 422-432 for coupling internal circuits of the IC to external components. For example, the controls 202 for the DC-DC converter can be coupled via a subset 427-430 of the terminals to the respective gates of the FETs of the DC-DC converter 108 to control the operation thereof. The controls 202 can also be coupled to the output voltage bus 112 via a terminal 431.

FIG. 4 also shows an example circuit diagram of the input node protection circuit 206. The protection circuit 206 can include a first comparator 413 to compare a voltage at the input node 116 (based on a voltage divider 414) to the input voltage present threshold. The first comparator 413 is coupled to the voltage at the input node 116 through terminal 422 of controller 110. An output of the comparator can be coupled to a state machine 416 which implements the decisional logic of the protection circuit 206.

The protection circuit 206 can also include a bypass current path 418 coupled in series between the input node 116 (via terminal 424) and the input node 106 (via terminal 426), and in parallel with AGATE 104. The bypass current path 418 is configured to generate and provide the test current to the input node 106 (via terminal 426) when AGATE 104 is in a non-conductive state. In this example, the test current is derived from the input voltage, which is the voltage at terminal 424. In the example shown in FIG. 4, the bypass current path 418 includes a current source that can be controlled by the state machine 416 to provide the test current to the input node 106. The current source can include a transistor that is linearly driven to control the test current. Ideally, the current source is controlled to limit the test current to a value much smaller than the normal operating current (e.g., less than 25% thereof) to reduce the likelihood of causing significant further damage due to a short on the input node 106. In an alternative example, the bypass current path 418 can include a resistor to provide the test current.

The protection circuit 206 can also include a second comparator 420 to compare a voltage on the input node 106 (the voltage at terminal 426) to a minimum voltage threshold. The output of the second comparator 420 is provided to the state machine 416.

The state machine 416 is configured to provide appropriate signals to control AGATE 104 and signals to control the current source in the bypass current path 418 based on the inputs from the first comparator 413 and the second comparator 420 to implement the protection scheme discussed herein. In particular, the state machine 416 can be coupled to the gate of the AGATE 104 via terminal 425 to set AGATE 104 in either a conductor or non-conductive email to control isolation of the input node 106 from the input voltage. In an example, the signals from the state machine 416 to control AGATE 402 are logic signals, wherein a first logic value (e.g., high) sets AGATE 402 into a conductive state, and the inverse logic value (e.g., low) sets AGATE 402 into a non-conductive state. In examples including SGATE 402 which provides reverse path isolation, the state machine 416 can also control SGATE 402 via a signal provided from terminal 423. In an implementation of such an example, the state machine 416 can set the SGATE 402 and AGATE 104 to the conductive state concurrently to enable proper current flow through the input node 106 with the DC-DC converter 108 in response to determining that no short is present on the input node 106. Other methods of controlling SGATE 402 can also be used.

The state machine 416 can be implemented using any suitable components including, but not limited to, combination logic, programmable logic (e.g., FPGA), and/or one or more processing devices (e.g., a microcontroller)). Additionally, in some examples, the components used to implement state machine 416 can also implement the controls 202 for the DC-DC converter 108. In other examples, separate components can be used to implement each. The controller 110 can be coupled to ground via a terminal 432.

Example Embodiments

Example 1 includes a system comprising: a DC-to-DC converter to convert a voltage on an input node to a voltage on an output node; a switching device coupled in series between an input voltage and the input node, the switching device configured to selectively isolate the input voltage from the input node; and a controller coupled to the input node and to the switching device, the controller configured to: apply a test current to the input node, enable the switching device to be switched from a non-conductive state to a conductive state if a voltage on the input node is above a threshold while the test current is applied to the input node; and restrict the switching device from being switched from the non-conductive state to the conductive state if the voltage on the input node is below the threshold while the test current is applied to the input node.

Example 2 includes the system of Example 1, wherein the current source is included in a bypass current path coupled in series between the DC supply node and the input node, the bypass current path in parallel with the switching device, wherein the test current is derived from an input voltage at the DC supply node.

Example 3 includes the system of Example 2, wherein the controller is configured to: determine when the input voltage is present; and apply the test current to the current source in response to the input voltage being present.

Example 4 includes the system of Example 3, wherein the controller is configured to: compare a voltage on the input node after a waiting period to a non-short threshold, the waiting period starting when the test current is applied to the input node.

Example 5 includes the system of any of Examples 1-4, wherein the output node is configured to provide voltage to one or more of system components and a battery.

Example 6 includes the system of any of Examples 1-5, wherein the DC-to-DC converter is one of a buck converter, boost converter, or buck-boost converter.

Example 7 includes the system of any of Examples 1-6, wherein the input voltage is provided by an AC-to-DC adapter.

Example 8 includes the system of any of Examples 1-7, wherein the switching device includes a field effect transistor (FET).

Example 9 includes the system of any of Examples 1-8, wherein enable the switching device to be switched from a non-conductive state to a conductive state includes switch the switching device from the non-conductive state to the conductive state, wherein restrict the switching device from being switched from the non-conductive state to the conductive state includes hold the switching device in the non-conductive state.

Example 10 includes a DC-to-DC controller circuit comprising: a plurality of terminals for coupling to external circuits; a control circuit coupled to a first subset of the plurality of terminals, the first subset of terminals configured to be coupled to one or more gates of one or more field-effect transistors (FETs) of a DC-to-DC converter, the control circuit configured to control operation of the DC-to-DC converter via the one or more gates; a current source coupled to a second terminal of the plurality of terminals, the second terminal configured to be coupled to an input node for the DC-to-DC converter; molding compound over the control circuit and current source, wherein the plurality of terminals are exposed from the molding compound; wherein the control circuit is coupled to a third terminal of the plurality of terminals, the third terminal configured to be coupled to a switching device in series between an DC supply node and the input node for the DC-to-DC converter, wherein the control circuit is configured to provide a first signal from the third terminal, the first signal configured to switch the switching device from a non-conductive state to a conductive state based on whether a voltage at the second terminal is above a first threshold while a test current from the current source is provided at the second terminal.

Example 11 includes the circuit of Example 10, wherein the control circuit is configured to provide a second signal from the third terminal, the second signal configured to hold the switching device in the non-conductive state if the voltage at the second terminal is below the first threshold while the test current is provided at the second terminal.

Example 12 includes the circuit of Example 11, wherein the switching device includes a field effect transistor (FET), wherein the third terminal is configured to be coupled to a gate of the FET.

Example 13 includes the circuit of Example 12, wherein the first signal and the second signal are each a logic signal, wherein the first signal is inverse of the second signal.

Example 14 includes the circuit of any of Examples 10-13, wherein the control circuit is configured to provide the first signal in response to the voltage at the second terminal being above the first threshold.

Example 15 includes the circuit of any of Examples 10-14, wherein the current source is coupled in series between a fourth terminal of the plurality of terminals and the second terminal, the fourth terminal configured to be coupled to an DC supply node, wherein the switching device is coupled in series between the DC supply node and the input node, the switching device configured to selectively isolate the voltage at the DC supply node from the input node, wherein the current source is configured to derive the test current from the input voltage.

Example 16 includes the circuit of Example 15, wherein the control circuit is configured to sense the voltage at the fourth terminal, and to provide the test current at the second terminal in response to the voltage at the fourth terminal rising above a second threshold.

Example 17 includes the circuit of Example 16, wherein the control circuit is configured to compare a voltage at the second terminal after a waiting period to the first threshold, the waiting period starting when the test current is provided at the second terminal.

Example 18 includes a method of applying an input voltage to an input node of a DC-to-DC converter, the method comprising: comparing an input voltage to a voltage present threshold; controlling a current source to provide a test current derived from the input voltage to the input node in response to the input voltage rising above the input voltage present threshold; comparing a voltage on the input node while the test current is applied thereto to a non-short threshold; if the voltage on the input node is above the non-short threshold, enabling the input voltage to be coupled to the input node; and if the voltage on the input node is below the non-short threshold, restricting the input voltage from being coupled to the input node.

Example 19 includes the method of Example 18, wherein providing a test current includes deriving the test current from the input voltage.

Example 20 includes the method of any of Examples 18-19, wherein enabling the input voltage to be coupled to the input node includes enabling a switching device coupled in series between the input voltage and the input node to be switched from a non-conductive state to a conductive state, and wherein restricting the input voltage from being coupled to the input node includes restricting the switching device from being switched from the non-conductive state to the conductive state.

Example 21 includes the method of Example 20, wherein enabling the switching device to be switched from a non-conductive state to a conductive state includes switching the switching device from the non-conductive state to the conductive state, wherein restricting the switching device from being switched from the non-conductive state to the conductive state includes holding the switching device in the non-conductive state.

Example 22 includes the method of any of Examples 18-21, wherein comparing a voltage on the input node to the non-short threshold includes comparing the voltage on the input node after a waiting period to the non-short threshold, the waiting period starting when the test current is applied to the input node.

What is claimed is:

1. A system comprising:
    a DC-to-DC converter to convert a voltage on an input node to a voltage on an output node;
    a switching device coupled in series between a DC supply node and the input node, the switching device configured to selectively isolate the DC supply node from the input node; and
    a controller coupled to the input node and to the switching device, the controller configured to:
        apply a test current from the controller to the input node;
        wait a predetermined amount of time after applying the test current from the controller to the input node before sensing the voltage on the input node;
        enable the switching device to be switched from a non-conductive state to a conductive state if the voltage on the input node is above a threshold after the test current has been applied from the controller to the input node for the predetermined amount of time; and
        restrict the switching device from being switched from the non-conductive state to the conductive state if the voltage on the input node is below the threshold while the test current is applied to the input node.

2. The system of claim 1, wherein the controller includes a bypass current path coupled in series between the DC supply node and the input node, the bypass current path in parallel with the switching device, the bypass current path configured to derive the test current from an input voltage at the DC supply node and provide the test current to the input node.

3. The system of claim 2, wherein the controller is configured to:
    determine when the input voltage is present; and
    apply the test current to the input node in response to the input voltage being present.

4. The system of claim 1, wherein the DC-to-DC converter is one of a buck converter, boost converter, or buck-boost converter.

5. The system of claim 1, wherein the input voltage is provided by an AC-to-DC adapter.

6. The system of claim 1, wherein the switching device includes a field effect transistor (FET).

7. The system of claim 1, wherein enable the switching device to be switched from the non-conductive state to the conductive state includes switch the switching device from the non-conductive state to the conductive state, wherein restrict the switching device from being switched from the nonconductive state to the conductive state includes hold the switching device in the nonconductive state.

8. A DC-to-DC controller circuit comprising:
    a plurality of terminals for coupling to external circuits;
    a control circuit coupled to a first subset of the plurality of terminals, the first subset of terminals configured to be coupled to one or more gates of one or more field effect transistors (FETs) of a DC-to-DC converter, the control circuit configured to control operation of the DC-to-DC converter via the one or more gates;

a current source coupled to a second terminal of the plurality of terminals, the second terminal configured to be coupled to an input node for the DC-to-DC converter; and molding compound over the control circuit and current source, wherein the plurality of terminals are exposed from the molding compound;

wherein the control circuit is coupled to a third terminal of the plurality of terminals, the third terminal configured to be coupled to a switching device in series between an DC supply node and the input node for the DC-to-DC converter, wherein the control circuit is configured to provide a first signal from the third terminal, the first signal configured to switch the switching device from a non-conductive state to a conductive state based on whether a voltage at the second terminal is above a first threshold after a test current from the current source has been provided at the second terminal for a predetermined waiting period.

9. The circuit of claim 8, wherein the control circuit is configured to provide a second signal from the third terminal, the second signal configured to hold the switching device in the non-conductive state if the voltage at the second terminal is below the first threshold while the test current is provided at the second terminal.

10. The circuit of claim 9, wherein the switching device includes a field effect transistor (FET), wherein the third terminal is configured to be coupled to a gate of the FET.

11. The circuit of claim 10, wherein the first signal and the second signal are each a logic signal, wherein the first signal is inverse of the second signal.

12. The circuit of claim 8, wherein the control circuit is configured to provide the first signal in response to a condition of the voltage at the second terminal rising above the first threshold after being below the first threshold.

13. The circuit of claim 8, wherein the current source is coupled in series between a fourth terminal of the plurality of terminals and the second terminal, the fourth terminal configured to be coupled to the DC supply node, wherein the switching device is coupled in series between the DC supply node and the input node, the switching device configured to selectively isolate the voltage at the DC supply node from the input node, wherein the current source is configured to derive the test current from the input voltage.

14. The circuit of claim 13, wherein the control circuit is configured to sense the voltage at the fourth terminal, and to provide the test current at the second terminal in response to the voltage at the fourth terminal rising above a second threshold.

15. The circuit of claim 14, wherein the control circuit is configured to compare a voltage at the second terminal after a waiting period to the first threshold, the waiting period starting when the test current is provided at the second terminal.

16. A method of applying an input voltage to an input node of a DC-to-DC converter, the method comprising:

comparing an input voltage to a voltage present threshold;

controlling a current source to provide a test current derived from the input voltage to the input node in response to the input voltage rising above the input voltage present threshold;

waiting a predetermined amount of time after providing the test current to the input node before sensing the voltage on the input node;

comparing a voltage sensed on the input node after the test current has been applied thereto for the predetermined amount of time to a non-short threshold;

if the voltage sensed on the input node after the predetermined amount of time is above the non-short threshold, enabling the input voltage to be coupled to the input node; and if the voltage sensed on the input node after the predetermined amount of time is below the non-short threshold, restricting the input voltage from being coupled to the input node.

17. The method of claim 16, wherein providing the test current includes deriving the test current from the input voltage.

18. The method of claim 16, wherein enabling the input voltage to be coupled to the input node includes enabling a switching device coupled in series between the input voltage and the input node to be switched from a non-conductive state to a conductive state, and wherein restricting the input voltage from being coupled to the input node includes restricting the switching device from being switched from the non-conductive state to the conductive state.

19. The method of claim 18, wherein enabling the switching device to be switched from the non-conductive state to the conductive state includes causing a transistor in the switching device to switch from the non-conductive state to the conductive state, wherein restricting the switching device from being switched from the nonconductive state to the conductive state includes causing the transistor in the switching device to stay in the nonconductive state.

20. The system of claim 1, wherein the test current is configured to cause the voltage on the input node to drive to a ground voltage when the input node has a short circuit condition.

21. The circuit of claim 8, wherein the test current is configured to cause the voltage on the input node to drive to a ground voltage when the input node has a short circuit condition.

22. The method of claim 16, wherein the test current is configured to cause the voltage on the input node to drive to a ground voltage when the input node has a short circuit condition.

* * * * *